(12) United States Patent
Chen et al.

(10) Patent No.: US 10,356,676 B2
(45) Date of Patent: Jul. 16, 2019

(54) RESOURCE SWITCHING METHOD, APPARATUS, AND SYSTEM

(71) Applicant: Huawei Technologies Co., Ltd., Shenzhen (CN)

(72) Inventors: Ji Chen, Shenzhen (CN); Ping Fang, Shenzhen (CN); Gaokun Pang, Shenzhen (CN); Xiaoxian Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/567,693

(22) PCT Filed: Apr. 20, 2015

(86) PCT No.: PCT/CN2015/077017
§ 371 (c)(1),
(2) Date: Oct. 19, 2017

(87) PCT Pub. No.: WO2016/168978
PCT Pub. Date: Oct. 27, 2016

(65) Prior Publication Data
US 2018/0160347 A1 Jun. 7, 2018

(51) Int. Cl.
*H04B 7/00* (2006.01)
*H04W 36/06* (2009.01)
(Continued)

(52) U.S. Cl.
CPC ............ *H04W 36/06* (2013.01); *H04W 4/50* (2018.02); *H04W 28/02* (2013.01); *H04W 28/26* (2013.01);
(Continued)

(58) Field of Classification Search
CPC ............ H04W 72/02; H04W 72/0406; H04W 72/048; H04W 72/121; H04W 72/1257
(Continued)

(56) References Cited

U.S. PATENT DOCUMENTS 9,480,013 B2 * 10/2016 Fang ..................... H04W 48/16
9,510,286 B2 * 11/2016 Abraham .......... H04W 52/0225
(Continued)

FOREIGN PATENT DOCUMENTS

| CN | 1897537 A | 1/2007 |
| CN | 102893657 A | 1/2013 |

(Continued)

OTHER PUBLICATIONS

NAN Technical Specification, Version 0.0.25, Mar. 11, 2015, Wi-Fi Alliance, pp. 1-101.*

*Primary Examiner* — Dmitry Levitan
(74) *Attorney, Agent, or Firm* — Leydig, Voit & Mayer, Ltd.

(57) ABSTRACT

Embodiments of the present invention provide a resource switching method, an apparatus, and a system. The method includes: receiving, by a first device, a first resource switching message sent by a second device, where the first device and the second device belong to a same service group, the first resource switching message includes first resource information, and the first resource information is used to indicate a first resource satisfying a resource switching requirement of the second device; determining, by the first device, a second resource in the first resource, where the second resource is a resource satisfying a resource switching requirement of the first device; and sending, by the first device, a second resource switching message, where the second resource switching message includes second
(Continued)

resource information, and the second resource information is used to indicate the second resource.

17 Claims, 5 Drawing Sheets

(51) Int. Cl.
| | |
|---|---|
| *H04W 28/02* | (2009.01) |
| *H04W 74/00* | (2009.01) |
| *H04W 4/50* | (2018.01) |
| *H04W 28/26* | (2009.01) |
| *H04W 72/02* | (2009.01) |
| *H04W 84/18* | (2009.01) |
| *H04W 36/38* | (2009.01) |
| *H04W 48/16* | (2009.01) |
| *H04W 72/04* | (2009.01) |

(52) U.S. Cl.
CPC ......... *H04W 72/02* (2013.01); *H04W 74/002* (2013.01); *H04W 36/38* (2013.01); *H04W 48/16* (2013.01); *H04W 72/04* (2013.01); *H04W 84/18* (2013.01)

(58) Field of Classification Search
USPC .................................. 370/310, 329, 484, 529
See application file for complete search history.

(56) References Cited

U.S. PATENT DOCUMENTS

| | | | | |
|---|---|---|---|---|
| 9,614,641 | B2* | 4/2017 | Geirhofer | ............. H04W 8/005 |
| 9,949,156 | B2* | 4/2018 | Patil | ....................... H04W 76/14 |
| 9,992,635 | B2* | 6/2018 | Xu | ........................ H04W 76/14 |
| 10,021,644 | B2* | 7/2018 | Patil | ..................... H04W 48/16 |
| 10,064,181 | B2* | 8/2018 | Han | .................. H04W 72/0453 |
| 2007/0253334 | A1 | 11/2007 | Mehta et al. | |
| 2014/0293851 | A1 | 10/2014 | Abraham et al. | |
| 2016/0057237 | A1* | 2/2016 | Yang | ...................... H04L 67/16 |
| | | | | 709/224 |
| 2016/0150390 | A1 | 5/2016 | Chen et al. | |
| 2016/0309404 | A1 | 10/2016 | Kasslin et al. | |
| 2017/0164374 | A1 | 6/2017 | Geirhofer et al. | |

FOREIGN PATENT DOCUMENTS

| | | |
|---|---|---|
| CN | 103338497 | 10/2013 |
| CN | 104105155 A | 10/2014 |
| CN | 104349285 A | 2/2015 |
| CN | 104363658 A | 2/2015 |
| WO | 2014109595 A1 | 7/2014 |
| WO | 2014161383 A1 | 10/2014 |

* cited by examiner

RESOURCE SWITCHING METHOD, APPARATUS, AND SYSTEM

CROSS-REFERENCE TO RELATED APPLICATIONS

This application is a national stage application of International Application No. PCT/CN2015/077017, filed on Apr. 20, 2015, which is hereby incorporated by reference in its entirety.

TECHNICAL FIELD

The present invention relates to the communications field, and in particular, to a resource switching method, an apparatus, and a system.

BACKGROUND

A NAN (neighbor awareness networking, neighbor awareness networking) technology based on the 802.11 standards provides functions of inter-device synchronization, service discovery, and data transmission.

By means of the NAN technology, devices may perform service discovery and transmit data to each other after the service discovery. Specifically, in a DW (discovery window, discovery window) in NAN, a first device sends a service discovery frame carrying service information of the first device, and a second device performs determining after receiving the service discovery frame. If the service information in the service discovery frame is service information needed by the second device, the second device sends a service response frame to the first device, thereby implementing service discovery between devices. Moreover, the first device and the second device set up an initial service group. When the service group is set up, the devices can agree on a time-frequency resource, and the devices in the service group transmit data to each other in the agreed time-frequency resource.

However, during actual application, due to changes in features of data transmission in the service group, when data traffic of data increases, because in the foregoing method, the devices in the service group always transmit data by using the initially agreed time-frequency resource, data transmission efficiency may be low.

SUMMARY

The present invention provides a resource switching method, an apparatus, and a system, to switch a time-frequency resource used by devices in a service group, thereby improving data transmission efficiency of the devices in the service group.

To achieve the foregoing objectives, the following technical solutions are used in the embodiments of the present invention:

According to a first aspect, an embodiment of the present invention provides a resource switching method, including:

receiving, by a first device, a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device;

determining, by the first device, a second resource in the first resource, where the second resource is a resource satisfying a resource switching requirement of the first device; and sending, by the first device, a second resource switching message, where the second resource switching message includes second resource information, and the second resource information is used to indicate the second resource.

With reference to the first aspect, in a first possible implementation of the first aspect, the first resource switching message further includes a first switching time, and the first switching time is a time that is indicated by the second device and that is used by the first device and the second device to perform resource switching.

With reference to the first aspect, or the first possible implementation of the first aspect, in a second possible implementation of the first aspect, the first resource information includes a first target resource, the second resource information includes a second target resource, and the determining, by the first device, second resource information in the first resource information includes:

if the first target resource satisfies the resource switching requirement of the first device, determining, by the first device, the first target resource as the second target resource.

With reference to the first aspect, the first possible implementation of the first aspect, or the second possible implementation of the first aspect, in a third possible implementation of the first aspect, the first resource further includes at least one first candidate resource, and the determining, by the first device, a second resource in the first resource further includes:

if the first target resource does not satisfy the resource switching requirement of the first device, determining, by the first device, a resource in the at least one first candidate resource as the second target resource, where the second target resource is a resource that is in the at least one first candidate resource, that satisfies the resource switching requirement of the first device, and that has optimal quality.

With reference to the third possible implementation of the first aspect, in a fourth possible implementation of the first aspect, the second resource information further includes a second candidate resource, and after the determining, by the first device, the second target resource, the method further includes:

determining, by the first device, the second candidate resource in the at least one first candidate resource, where the second candidate resource is a resource other than the second target resource in the second resource.

With reference to any one of the second possible implementation of the first aspect to the fourth possible implementation of the first aspect, in a fifth possible implementation of the first aspect, the resource response message further includes a second switching time, and the second switching time is a time that is indicated by the first device and that is used by the first device and the second device to perform resource switching, where if the second target resource is the first target resource, the second switching time is the first switching time; or if the second target resource is a resource in the first candidate resource, the second switching time is a time obtained by adding the first switching time and preset duration.

With reference to any one of the second possible implementation of the first aspect to the fifth possible implementation of the first aspect, in a sixth possible implementation of the first aspect, the first target resource includes at least one of a time resource or a frequency resource; and the at least one first candidate resource includes at least one of a time resource or a frequency resource.

With reference to the first aspect, in a seventh possible implementation of the first aspect, the first device is a primary device, devices other than the first device in the service group are member devices, and before the receiving, by a first device, a first resource switching message sent by a second device, the method further includes:

sending, by the primary device, a first indication, where the first indication is used to instruct each member device in the service group to report information about a resource satisfying a resource switching requirement of the member device.

According to a second aspect, an embodiment of the present invention provides user equipment, including:

a receiving module, configured to receive a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device;

a determining module, configured to determine a second resource in the first resource, where the second resource is a resource satisfying a resource switching requirement of the first device; and a sending module, configured to send a second resource switching message, where the second resource switching message includes the second resource information, and the second resource information is used to indicate the second resource.

With reference to the second aspect, in a first possible implementation of the second aspect, the first resource switching message further includes a first switching time, and the first switching time is a time that is indicated by the second device and that is used by the first device and the second device to perform resource switching.

With reference to the second aspect, or the first possible implementation of the second aspect, in a second possible implementation of the second aspect, the first resource information includes a first target resource, the second resource information includes a second target resource, and the determining module is specifically configured to:

if the first target resource satisfies the resource switching requirement of the first device, determine the first target resource as the second target resource.

With reference to the second aspect, the first possible implementation of the second aspect, or the second possible implementation of the second aspect, in a third possible implementation of the second aspect, the first resource further includes at least one candidate resource, and the determining module is further specifically configured to:

if the first target resource does not satisfy the resource switching requirement of the first device, determine a resource in the at least one first candidate resource as the second target resource, where the second target resource is a resource that is in the at least one first candidate resource, that satisfies the resource switching requirement of the first device, and that has optimal quality.

With reference to the third possible implementation of the second aspect, in a fourth possible implementation of the second aspect, the second resource information further includes a second candidate resource, and the determining module is further configured to: after determining the second target resource, determine the second candidate resource in the at least one first candidate resource, where the second candidate resource is a resource other than the second target resource in the second resource.

With reference to any one of the second possible implementation of the second aspect to the fourth possible implementation of the second aspect, in a fifth possible implementation of the second aspect, the resource response message further includes a second switching time, and the second switching time is a time that is indicated by the first device and that is used by the first device and the second device to perform resource switching, where if the second target resource is the first target resource, the second switching time is the first switching time; or if the second target resource is a resource in the first candidate resource, the second switching time is a time obtained by adding the first switching time and preset duration.

With reference to any one of the second possible implementation of the second aspect to the fifth possible implementation of the second aspect, in a sixth possible implementation of the second aspect, the first target resource includes at least one of a time resource or a frequency resource; and the at least one first candidate resource includes at least one of a time resource or a frequency resource.

With reference to the second aspect, in a seventh possible implementation of the second aspect, the first device is a primary device, devices other than the first device in the service group are member devices, and the sending module is further configured to: before the receiving module receives the first resource switching message sent by the second device, send a first indication, where the first indication is used to instruct each member device in the service group to report information about a resource satisfying a resource switching requirement of the member device.

According to a third aspect, an embodiment of the present invention provides user equipment, including:

a receiver, configured to receive a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device;

a processor, configured to determine a second resource in the first resource, where the second resource is a resource satisfying a resource switching requirement of the first device; and a transmitter, configured to send a second resource switching message, where the second resource switching message includes the second resource information, and the second resource information is used to indicate the second resource.

With reference to the third aspect, in a first possible implementation of the third aspect, the first resource switching message further includes a first switching time, and the first switching time is a time that is indicated by the second device and that is used by the first device and the second device to perform resource switching.

With reference to the third aspect, or the first possible implementation of the third aspect, in a second possible implementation of the third aspect, the first resource information includes a first target resource, the second resource information includes a second target resource, and the processor is specifically configured to:

if the first target resource satisfies the resource switching requirement of the first device, determine the first target resource as the second target resource.

With reference to the third aspect, the first possible implementation of the third aspect, or the second possible implementation of the third aspect, in a third possible implementation of the third aspect, the first resource further includes at least one candidate resource, and the processor is further specifically configured to:

if the first target resource does not satisfy the resource switching requirement of the first device, determine a resource in the at least one first candidate resource as the second target resource, where the second target resource is a resource that is in the at least one first candidate resource, that satisfies the resource switching requirement of the first device, and that has optimal quality.

With reference to the third possible implementation of the third aspect, in a fourth possible implementation of the third aspect, the second resource information further includes a second candidate resource, and the processor is further configured to: after determining the second target resource, determine the second candidate resource in the at least one first candidate resource, where the second candidate resource is a resource other than the second target resource in the second resource.

With reference to the third possible implementation of the third aspect, in a fourth possible implementation of the third aspect, the resource response message further includes a second switching time, and the second switching time is a time that is indicated by the first device and that is used by the first device and the second device to perform resource switching, where if the second target resource is the first target resource, the second switching time is the first switching time; or if the second target resource is a resource in the first candidate resource, the second switching time is a time obtained by adding the first switching time and preset duration.

With reference to any one of the second possible implementation of the third aspect to the fifth possible implementation of the third aspect, in a sixth possible implementation of the third aspect, the first target resource includes at least one of a time resource or a frequency resource; and the at least one first candidate resource includes at least one of a time resource or a frequency resource.

With reference to the third aspect, in a seventh possible implementation of the third aspect, the first device is a primary device, devices other than the first device in the service group are member devices, and the transmitter is further configured to: before the receiver receives the first resource switching message sent by the second device, send a first indication, where the first indication is used to instruct each member device in the service group to report information about a resource satisfying a resource switching requirement of the member device.

According to a fourth aspect, an embodiment of the present invention provides a service system, including at least two user equipments according to any one of the second aspect, or at least two user equipments according to any one of the third aspect.

According to the resource switching method, the apparatus, and the system provided in the present invention, the method includes: receiving, by a first device, a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device; determining, by the first device, a second resource in the first resource, where the second resource is a resource satisfying a resource switching requirement of the first device; and sending, by the first device, a second resource switching message, where the second resource switching message includes second resource information, and the second resource information is used to indicate the second resource. Therefore, the second device receives the first resource switching message sent by the first device and determines the second resource according to the first resource in the first resource switching message. Resources in the second resource are resources that can satisfy resource switching requirements of the first device and the second device. Therefore, resources in a service group can be switched by using the foregoing method. When resources needed by the service group increase, the service group may switch from currently-used resources to other idle resources, thereby improving data transmission efficiency in the service group.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
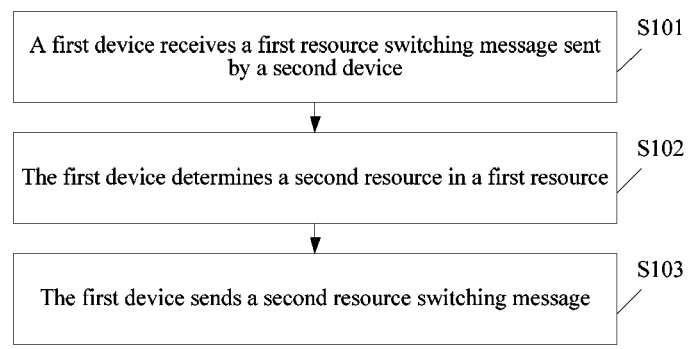
FIG. 1 is a schematic flowchart 1 of a resource switching method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

802.11 is a communication standard for a wireless local area network formulated by the IEEE (Institute of Electrical and Electronics Engineers, Institute of Electrical and Electronics Engineers). A NAN technology is a technology based on the 802.11 standard and can provide functions of inter-device synchronization, service discovery, and data transmission. A service group based on the NAN technology may have several devices, and the devices may transmit data to each other. The service group based on the NAN technology does not have a central node at a link level, and the devices in the service group are equal.

Specifically, in a particular time window (that is, a discovery window DW), a device A sends a service discovery frame carrying service information of the device A. The service discovery frame may be sent by using a broadcast or multicast manner. After receiving the service discovery frame sent by the device A, another device determines whether the service information in the service discovery frame is the same as service information needed by the another device. If the service information in the service discovery frame is the same as the service information needed by the another device, the another device sends a response message to the device A to implement service discovery, thereby setting up an initial service group. Each device in the service group may continuously send service information of the service group in another discovery window. After discovering the service group, the another device may request, according to the service information of the service group, to join the service group.

If a service group already exists, a process in which another device joins the service group is that: The another device finds that the service group already exists. The another device sends, to the service group, a request message for joining the service group. Devices in the service group race with each other to send, to the another device, a response message for joining the service group. For example, a service group G already exists. In the service group G, there are a device A, a device B, and a device C. A device D knows, by means of service discovery, that the service group G already exists. The device D requests to join the service group G. The device D sends, to the service group G, a request message for joining the service group. The device A, the device B, and the device C in the service group G can all receive the request message for joining the service group. Next, the device A, the device B, and the device C all respond to the request message for joining the service group, add, to message sending queues of the device A, the device B, and the device C, response messages for joining the service group, and contend for a channel resource by using a CSMA (Carrier Sense Multiple Access, carrier sense multiple access) mechanism. In a process of contention for a channel resource, if a device in the service group G receives a response message for joining the service group sent by another device in the service group G, the device no longer sends a response message for joining the service group, and deletes the response message for joining the service group from a sending queue of the device. For example, the device B obtains a channel resource through contention by using the CSMA mechanism and sends a response message for joining the service group. After the device A and the device C receive the response message for joining the service group sent by the device B, the device A and the device C delete response messages for joining the service group from sending queues of the device A and the device C.

Further, when a service group is set up, devices may agree on how to transmit data. Specifically, the devices agree on a time-frequency resource (that is, a time and frequency resource). In the agreed time-frequency resource, the devices transmit data to each other. The time-frequency resource may be discrete resource blocks, and the resource blocks may be located at different time and on different channels.

Usually, there are two manners for describing a time-frequency resource. In a first manner, for example, devices in a service group 1 indicate that time-frequency resources used by the service group are the $0^{th}$ second to the $2^{nd}$ second on a $6^{th}$ channel, the $5^{th}$ second to the 7th second on an $8^{th}$ channel, and the $10^{th}$ second to the $12^{th}$ second on a $10^{th}$ channel. Devices in a service group 2 indicate that time-frequency resources used by the service group are the $3^{rd}$ second to the $4^{th}$ second on a $2^{nd}$ channel, the $6^{th}$ second to the $7^{th}$ second on the $6^{th}$ channel, and the $9^{th}$ second to the $10^{th}$ second on the $10^{th}$ channel. In a second manner, for example, a time-frequency resource indicator is used for indication. Time-frequency resource indicators indicate different resource block sets. A name or a number is assigned to each resource block set. For example, a resource A has a number #1, and a resource B has a number #2. The resource A includes at least time information and frequency information, and the resource B also includes at least time information and frequency information.

Embodiment 1

An embodiment of the present invention provides a resource switching method. As shown in FIG. 1, FIG. 1 is a schematic flowchart of the resource switching method. The method includes the following steps.

S101: A first device receives a first resource switching message sent by a second device.

The first resource switching message is used to instruct devices in a service group to perform resource switching. The first resource switching message includes first resource information. The first resource information is used to indicate a first resource satisfying a resource switching requirement of the second device. The first device and the second device belong to a same service group.

It should be noted that the technical solution provided in this embodiment of the present invention is applied to two scenarios. In a first scenario, devices in a service group are equal. In a second scenario, a service group includes one primary device and several member devices.

In the first scenario, the first device and the second device are any two different devices in the service group. When a data transmission amount of the second device increases, the second device wants to perform resource switching and transmits data by using a resource that is more suitable for the data transmission amount. Therefore, the second device sends a first resource switching message. The first resource switching message is used to instruct other devices in the service group to perform resource switching. The first device receives the first resource switching message sent by the second device and determines a second resource according to the first resource.

In the second scenario, the second device is any member device in the service group, and the first device is the primary device in the service group. The primary device may receive a first resource switching message sent by each member device in the service group. The first resource switching message includes first resource information. The first resource information in the first resource switching message sent by each member device includes a first resource satisfying a resource switching requirement of the member device. The primary device determines a second resource according to first resources sent by all member devices in the service group.

S102: The first device determines a second resource in a first resource.

The second resource is used to indicate a resource satisfying a resource switching requirement of the first device.

In the first scenario, the first resource includes a first target resource, and the second resource includes a second target resource. The determining, by the first device, a second resource in a first resource includes: if the first target resource satisfies the resource switching requirement of the first device, determining, by the first device, the first target resource as the second target resource.

The first resource further includes at least one first candidate resource. If the first target resource does not satisfy the resource switching requirement of the first device, the first device determines a resource in the first candidate resource as the second target resource. The second target resource is a resource that is in the first candidate resource, that satisfies the resource switching requirement of the first device, and that has optimal quality.

In the second scenario, the first resource information includes information about a resource satisfying the resource switching requirement of the member device. The first device determines the second resource according to the first resources sent by all the member devices in the service group. Second resource information is used to indicate the resource satisfying the resource switching requirement of the first device. The second resource information is also used to indicate the resource satisfying the resource switching requirement of each member device in the service group.

S103: The first device sends a second resource switching message.

The second resource switching message includes the second resource information, and the second resource information is used to indicate the second resource.

The first device sends the second resource switching message that includes the second resource information to the devices in the service group. Specifically, the first device may send the second resource switching message by using a broadcast or multicast manner, or send the second resource switching message to the devices in the service group by using a unicast manner.

In the first scenario, the first device sends the second resource switching message to the devices in the service group. After receiving the second resource switching message sent by the first device, the devices in the service group perform a same operation as the first device does. It should be noted that after receiving the second resource switching message sent by the first device, the second device only needs to record the second resource information in the second resource switching message. After all the devices in the service group perform the process of the first device, a device that is in the service group and that sends a resource switching message last determines a target resource satisfying resource switching requirements of the devices in the service group.

In the second scenario, the primary device determines the second resource according to the first resources sent by all the member devices in the service group. A target resource included in the second resource is a target resource satisfying resource switching requirements of all the devices in the service group.

This embodiment of the present invention provides a resource switching method, including: receiving, by a first device, a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device; determining, by the first device, a second resource in the first resource, where the second resource is a resource satisfying a resource switching requirement of the first device; and sending, by the first device, a second resource switching message, where the second resource switching message includes second resource information, and the second resource information is used to indicate the second resource.

Based on the description of the foregoing embodiment, according to the resource switching method provided in the present invention, a second device receives a first resource switching message sent by a first device, and determines a second resource according to a first resource in the first resource switching message. Resources in the second resource are resources that can satisfy resource switching requirements of the first device and the second device. Therefore, resources in a service group can be switched by using the foregoing method. When resources needed by the service group increase, the service group may switch from currently-used resources to other idle resources, thereby improving data transmission efficiency in the service group.

Embodiment 2

Figure 2:
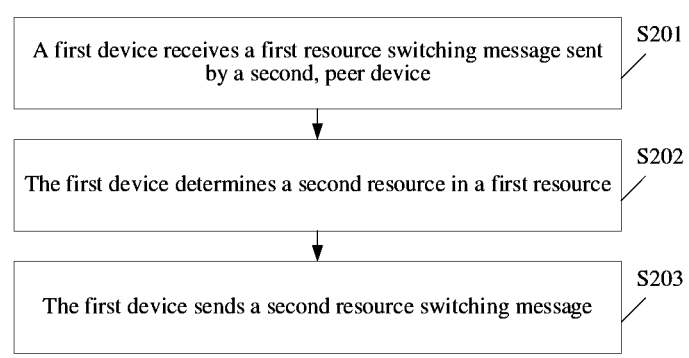
FIG. 2 is a schematic flowchart 2 of a resource switching method according to an embodiment of the present invention.

An embodiment of the present invention provides a resource switching method. The resource switching method is applied to a scenario in which devices in a service group are peer devices. As shown in FIG. 2, FIG. 2 is a schematic flowchart of the resource switching method. The method includes the following steps.

S201: A first device receives a first resource switching message sent by a second device.

The first resource switching message is used to instruct devices in a service group to perform resource switching. The first resource switching message includes first resource information. The first resource information is used to indicate a first resource satisfying a resource switching requirement of the second device. The first device and the second device belong to a same service group.

For example, a service group A includes several devices. The several devices transmit data according to a time-frequency resource agreed upon when the service group A is initially set up. When a data transmission amount of a second device (the second device is any device in the service group A) in the service group A increases, or when a transmission capability of a current time-frequency resource is affected due to changes in an ambient environment, the second device finds that the current time-frequency resource used by the service group A cannot satisfy a data transmission requirement of the service group A. Therefore, the second device monitors an idle resource in a network and determines first resource information according to a data transmission requirement of the second device.

The first resource includes a first target resource and a first candidate resource. The first target resource is one resource, and the first candidate resource may be one or more resources, or may be zero resources (that is, there is no suitable first candidate resource). A manner in which the second device monitors an idle resource in the network may be that: The second device determines a status of a time-frequency resource of each channel according to signal information of each channel. Usually, when the second device monitors an idle resource in the network, a specific monitoring range refers to signal coverage of a WiFi (wireless fidelity, Wireless Fidelity) hotspot.

Further, the first target resource and the first candidate resource may be represented by using either of the foregoing two manners of describing the time-frequency resource.

After determining a second resource switching message, the second device sends the second resource switching message to other devices in the service group A. The second device may send a first resource switching message to the other devices in the service group A by using a broadcast or multicast manner, or may separately send the second resource switching message to the devices in the service group A by using a unicast manner.

Next, a first device (the first device is any device other than the second device in the service group A) in the service group A receives the first resource switching message sent by the second device. That is, all the devices other than the second device in the service group A receive the first resource switching message.

S202: The first device determines a second resource in a first resource.

Second resource information is used to indicate the second resource satisfying a resource switching requirement of the first device.

The second resource includes a second target resource and a second candidate resource. The second candidate resource may include one or more resources, or may include zero resources (that is, there is no suitable second candidate resource). Usually, the second candidate resource is a subset of the first candidate resource. The second target resource should exist in the first target resource or the first candidate resource, and resources in the second candidate resource should exist in the first candidate resource. That is, in a service group, after a device selects a resource satisfying a resource switching requirement of the device, a subsequent device can select, from only the resource selected by the device, a resource that satisfies a resource switching requirement of the subsequent device. For example, the first target resource is a resource #1, and the first candidate resource is resources #2, #3, and #4. The second target resource may be the resource #1, the resource #2, the resource #3, or the resource #4. The second candidate resource is all or some of the resources #2, #3, and #4 except the second target resource.

After receiving the first resource switching message sent by the second device, the first device knows that the second device wants to perform resource switching. The first device first determines whether the first target resource can satisfy the resource switching requirement of the first device.

If the first target resource satisfies the resource switching requirement of the first device, the first device determines the first target resource as the second target resource. If the first target resource does not satisfy the resource switching requirement of the first device, the first device determines a resource in the first candidate resource as the second target resource. The second target resource is a resource that is in the first candidate resource, that satisfies the resource switching requirement of the first device, and that has optimal quality.

The first device determines the second candidate resource in the first candidate resource. The second candidate resource is a resource other than the second target resource in the resource satisfying the resource switching requirement of the first device.

S203: The first device sends a second resource switching message.

After determining the second resource information, the first device sends the second resource switching message to the other devices in the service group A. The second resource switching message includes the second resource information. The second resource information is used to indicate the second resource.

It should be noted that in a service group supporting the NAN technology, at one moment, only one device can send a message. Therefore, after the first device sends the second resource switching message, and after another device that is in the service group A and that performs an operation same as that performed by the first device detects that the first device sends the second resource switching message, the another device stops responding to the first resource switching message, but instead, receives the second resource switching message sent by the first device and determines, in the second resource switching message, a target resource and a candidate resource that satisfy a resource switching requirement of the another device.

For a resource switching process initiated by one device, after all devices in a service group send a resource switching message, it is considered that the devices in the service group obtain an agreed target resource through negotiation. Therefore, at a preset time, the devices switch to the new target resource to perform communication.

For example, a service group B includes four devices (a device 1, a device 2, a device 3, and a device 4). The device 1 first initiates a resource switching process according to a data transmission requirement. That is, the device 1 sends a first resource switching message to the devices in the service group B. The first resource switching message includes first resource information. A first resource indicated by the first resource information includes a first target resource a(#1) and first candidate resources b(#3), c(#5), and d(#7). After the device 2, the device 3, and the device 4 receive the first resource switching message, the device 2, the device 3, and the device 4 determine second resources according to the first resource. The device 2 determines a second resource after monitoring. The second resource includes a second target resource b(#3) and second candidate resources c(#5) and (#7). The device 2 sends a second resource switching message including the second resource to the devices in the service group B. At this time, the device 3 has not determined a target resource and a candidate resource that satisfy a resource switching requirement of the device 3. The device 4 determines that a target resource a(#1) and candidate resources b(#3), c(#5), and d(#7) satisfy a resource switching requirement of the device 4. After the device 3 detects the second resource switching message sent by the device 2, the device 3 stops determining, according to the first resource, a second resource satisfying the resource switching requirement of the device 3, but instead, receives the second resource switching message sent by the device 2 and determines, according to the second resource, the second resource satisfying the resource switching requirement of the device 3. After the device 4 detects the second resource switching message sent by the device 2, the device 4 does not send information about the second resource satisfying the resource switching requirement of the device 4, but instead, receives the second resource switching message sent by the device 2 and determines, according to the second resource switching message, the information about the second resource satisfying the resource switching requirement of the device 4. After the device 3 and the device 4 perform the process same as that performed by the device 2, that is, after each device in the service group B sends, to other devices in the service group B, a target resource and a candidate resource that satisfy a resource switching requirement of the device, the device 1, the device 2, the device 3, and the device 4 select, as an eventual target resource for resource switching, a common resource that all the devices support. In the foregoing example, the device 1 first determines that a target resource is a(#1) and candidate resources are b(#3), c(#5), and d(#7). The device 2 then determines that a target resource is b(#3) and candidate resources are c(#5) and d(#7). The device 3 then determines that a target resource is b(#3) and candidate resources are c(#5) and d(#7). Finally, the device 4 determines that a target resource is d(#7) and there is no candidate resource. Eventually, the service group B uses, as a target resource for resource switching, the target resource d(#7) determined by the device that is in the service group B and that determines a target resource last, that is, the device 4, and uses the resource d(#7) to perform communication after a resource switching time is reached.

It needs to be additionally noted that the first target resource includes at least one of a time resource or a frequency resource, and the first candidate resource also includes at least one of a time resource or a frequency resource.

Further, the first resource switching message further includes a first switching time. The first switching time is a time that is indicated by the second device and that is used by the first device and the second device to perform resource switching. The second resource switching message further includes a second switching time. The second switching time is a time that is indicated by the first device and that is used by the first device and the second device to perform resource switching. If the second target resource is the first target resource, the second switching time is the first switching time. If the second target resource is a resource in the first candidate resource, the second switching time is a time obtained by adding the first switching time and preset duration.

Optionally, after the first device receives the first resource switching message sent by the second device, if the second target resource determined by the first device is the same as the target resource sent by the second device, a value of the second switching time is set to be equal to a value of the first switching time. If the second target resource determined by the first device is not the same as the target resource sent by the second device, a value of the second switching time is set to be greater than a value of the first switching time.

If another device finds, according to a monitoring condition of the another device, that the another device cannot use a received target resource as a target resource of the another device, the another device selects a target resource of the another device from received candidate resources, and then determines a new target resource. Usually, a switching time determined in this case is a new time, so that all devices in a service group can monitor the new target resource. All the devices in the service group perform a new round of negotiation on the new target resource. A process is the same as that of the foregoing approach after the first device receives the first resource switching message. Each device may send a resource switching message to the other devices in the service group by using a broadcast or multicast manner, or may send a resource switching message to each device by using a unicast manner.

After the first device sends the second resource switching message to the devices in the service group, if the first device is a device that is in the service group and that determines last a target resource and a candidate resource that satisfy a resource switching requirement of the first device, the devices in the service group switch, according to an agreed switching time, to the second target resource to perform communication.

It needs to be additionally noted that a criterion used by the first device to determine whether the first target resource satisfies a resource switching condition of the first device is preset. This is not limited in the present invention.

For example, if a current data transmission service of the first device needs a transmission rate of 8 M/s, the first device may determine, as a resource satisfying the resource switching condition of the first device, a resource that is in the resources and that supports a data transmission rate greater than 8 M/s.

This embodiment of the present invention provides a resource switching method, including: receiving, by a first device, a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device; determining, by the first device, a second resource in the first resource, where the second resource is a resource satisfying a resource switching requirement of the first device; and sending, by the first device, a second resource switching message, where the second resource switching message includes second resource information, and the second resource information is used to indicate the second resource.

Based on the description of the foregoing embodiment, according to the resource switching method provided in the present invention, a second device receives a first resource switching message sent by a first device, and determines a second resource according to a first resource in the first resource switching message. Resources in the second resource are resources that can satisfy resource switching requirements of the first device and the second device. Therefore, resources in a service group can be switched by using the foregoing method. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 3

Figure 3:
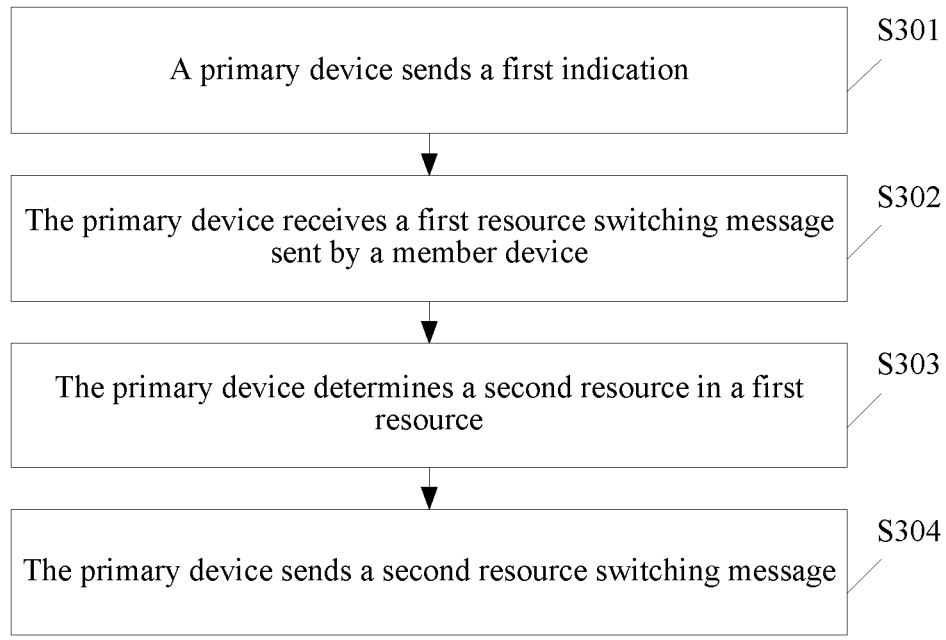
FIG. 3 is a schematic flowchart 3 of a resource switching method according to an embodiment of the present invention.

An embodiment of the present invention provides a resource switching method. As shown in FIG. 3, FIG. 3 is a schematic flowchart of the resource switching method. The method includes the following steps.

S301: A primary device sends a first indication.

The first indication is used to instruct each member device in a service group to report information about a resource satisfying a resource switching requirement of the member device.

S302: The primary device receives a first resource switching message sent by a member device.

The member device includes each member device in the service group. First resource information is used to indicate a first resource that is reported by each member device and that satisfies the resource switching requirement of the member device. Second resource information is used to indicate a second resource satisfying the resource switching requirement of each member device.

Further, after receiving the information that is reported by each member device and that is about a resource satisfying the resource switching requirement of the member device, the primary device integrates information that is reported by members and that is about resources, determines a same resource in the information that is reported by the member devices and that is about the resources, and determines the second resource information. The second resource information is used to indicate the second resource satisfying the resource switching requirement of each member device.

S303: The primary device determines a second resource in a first resource.

The second resource information is used to indicate a resource satisfying a resource switching requirement of a first device, and is at the same time used to indicate a resource satisfying the resource switching requirements of the member devices in the service group.

A second resource switching message includes a third switching time. The third switching time is a time used by each member device to perform resource switching. The third switching time is a switching time determined by the primary device.

S304: The primary device sends a second resource switching message.

The second resource switching message includes the second resource information.

After receiving the second resource switching message sent by the primary device, the member devices in the service group obtain the second resource information and the third switching time. After the third switching time is reached, all the devices in the service group (including the member devices and the primary device) switch to a second target resource indicated by the second resource information.

This embodiment of the present invention provides a resource switching method, including: receiving, by a first device, a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device; determining, by the first device, a second resource in the first resource, where the second resource is a resource satisfying a resource switching requirement of the first device; and sending, by the first device, a second resource switching message, where the second resource switching message includes second resource information, and the second resource information is used to indicate the second resource.

Based on the description of the foregoing embodiment, according to the resource switching method provided in the present invention, a second device receives a first resource switching message sent by a first device, and determines a second resource according to a first resource in the first resource switching message. Resources in the second resource are resources that can satisfy resource switching requirements of the first device and the second device. Therefore, resources in a service group can be switched by using the foregoing method. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 4

Figure 4:
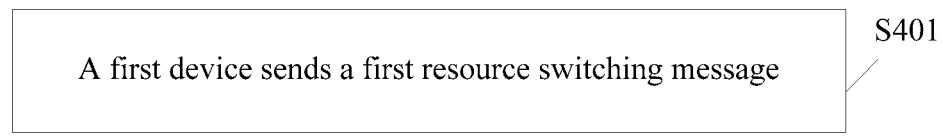
FIG. 4 is a schematic flowchart 4 of a resource switching method according to an embodiment of the present invention.

An embodiment of the present invention provides a resource switching method. As shown in FIG. 4, FIG. 4 is a schematic flowchart of the resource switching method. The method includes the following steps.

S401: A first device sends a first resource switching message.

The first resource switching message is used to instruct devices in a service group to perform resource switching.

It should be noted that when the first device is any peer device in the service group, before sending the first resource switching message, the first device further monitors an idle resource in a network, and determines information of a first resource satisfying a resource switching requirement of the first device. The information is first resource information used to indicate the first resource satisfying the resource switching requirement of the first device. The first resource includes a first target resource and a first candidate resource. The first resource switching message further includes a first switching time. The first switching time is a time that is indicated by the first device and that is used by the first device and the devices in the service group to perform resource switching.

After receiving the first resource switching message sent by the first device, other devices in the service group determine second resource information according to the first resource information. Specifically, subsequent operation processes of the other devices are already described in detail in Embodiment 2, and details are not described herein again.

When the first device is a primary device and the devices other than the first device in the service group are member devices, the first resource switching message includes the first resource information. The first resource information is used to indicate a resource satisfying resource switching requirements of the devices in the service group. The first resource information includes a first target resource. The first resource switching message further includes a first switching time. The first switching time is a time that is indicated by the first device and that is used by the first device and the devices in the service group to perform resource switching.

Further, before sending the first resource switching message, the primary device further monitors an idle resource in a network, so as to determine the first target resource satisfying the resource switching requirements of the devices in the service group. It needs to be additionally noted that the primary device may instruct the member devices in the service group to monitor an idle resource in the network, so as to determine the first target resource according to monitoring results of the member devices. This is not limited in the present invention.

After receiving the first resource switching message sent by the primary device, the member devices in the service group obtain the first target resource and the first switching time from the first resource switching message. After the first switching time is reached, all member devices in the service group switch to the first target resource to transmit data.

This embodiment of the present invention provides a resource switching method, including: sending, by a first device, a first resource switching message, where the first resource switching message is used to instruct devices in a service group to perform resource switching.

Based on the description of the foregoing embodiment, according to the resource switching method provided in the present invention, a first device sends a first resource switching message, and resources in a service group can be switched. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 5

Figure 5:
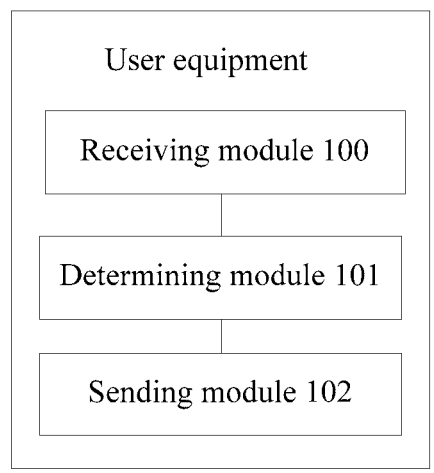
FIG. 5 is a schematic structural diagram 1 of user equipment according to an embodiment of the present invention.

An embodiment of the present invention provides user equipment. As shown in FIG. 5, FIG. 5 is a schematic structural diagram of the user equipment. The user equipment includes a receiving module 100, a determining module 101, and a sending module 102.

The receiving module 100 is configured to receive a first resource switching message sent by a second device, where the first resource switching message is used to instruct devices in a service group to perform resource switching, the first resource switching message includes first resource information, the first resource information is used to indicate a first resource satisfying a resource switching requirement of the second device, and a first device and the second device belong to a same service group.

The determining module 101 is configured to determine a second resource in the first resource, where the second resource is a resource satisfying a resource switching requirement of the first device.

The sending module 102 is configured to send a second resource switching message, where the second resource switching message includes second resource information.

The first resource switching message further includes a first switching time. The first switching time is a time that is indicated by the second device and that is used by the first device and the second device to perform resource switching.

The first resource includes a first target resource and a first candidate resource. The second resource includes a second target resource. The determining module 101 is specifically configured to: if the first target resource satisfies the resource switching requirement of the first device, determine the first target resource as the second target resource; or if the first target resource does not satisfy the resource switching requirement of the first device, determine a resource in at least one first candidate resource as the second target resource, where the second target resource is a resource that is in the at least one first candidate resource, that satisfies the resource switching requirement of the first device, and that has optimal quality.

The determining module 101 is further configured to: after determining the second target resource, determine a second candidate resource in the first candidate resource, where the second candidate resource is a resource other than the second target resource in resources satisfying the resource switching requirement of the first device.

A resource response message further includes a second switching time. The second switching time is a time that is indicated by the first device and that is used by the first device and the second device to perform resource switching.

If the second target resource is the first target resource, the second switching time is the first switching time. If the second target resource is a resource in the first candidate resource, the second switching time is a time obtained by adding the first switching time and preset duration.

The first target resource includes at least one of a time resource or a frequency resource. The first candidate resource includes at least one of a time resource or a frequency resource.

The first device is a primary device. Devices other than the first device in the service group are member devices. The sending module 102 is further configured to: before the receiving module receives the first resource switching message sent by the second device, send a first indication, where the first indication is used to instruct each member device in the service group to report information about a resource satisfying a resource switching requirement of the member device.

The second device includes each member device in the service group. The first resource information includes the information that is reported by each member device and that is about a resource satisfying the resource switching requirement of the member device. The second resource information is used to indicate a resource satisfying the resource switching requirement of each member device.

A second resource switching message includes a third switching time. The third switching time is a time used by each member device to perform resource switching.

This embodiment of the present invention provides user equipment, including: the receiving module, configured to receive a first resource switching message sent by a second device, where the first device and the second device belong to a same service group, the first resource switching message is used to instruct devices in the service group to perform resource switching, the first resource switching message includes first resource information, and the first resource information is used to indicate a first resource satisfying a resource switching requirement of the second device; the determining module, configured to determine a second resource in the first resource, where the second resource is a resource satisfying a resource switching requirement of the first device; and the sending module, configured to send a second resource switching message, where the second resource switching message includes second resource information, and the second resource information is used to indicate the second resource.

Based on the description of the foregoing embodiment, the user equipment provided in the present invention receives a first resource switching message sent by a first device, and determines a second resource according to a first resource in the first resource switching message. Resources in the second resource are resources that can satisfy resource switching requirements of the user equipment equipment and a second device. Therefore, resources in a service group can be switched by using the foregoing method. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 6

Figure 6:
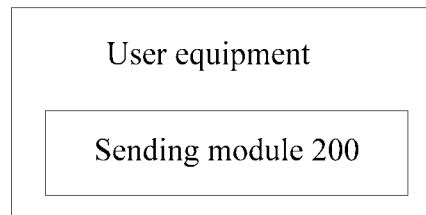
FIG. 6 is a schematic structural diagram 2 of user equipment according to an embodiment of the present invention.

An embodiment of the present invention provides user equipment. As shown in FIG. 6, FIG. 6 is a schematic structural diagram of the user equipment. The user equipment includes a sending module 200.

The sending module 200 is configured to send a first resource switching message, where the first resource switching message is used to instruct devices in a service group to perform resource switching.

The first resource switching message includes first resource information. The first resource information is used to indicate a first resource satisfying a resource switching requirement of a first device. The first resource includes a first target resource and a first candidate resource.

The first resource switching message further includes a first switching time. The first switching time is a time that is indicated by the first device and that is used by the first device and the devices in the service group to perform resource switching.

The first device is a primary device. Devices other than the first device in the service group are member devices.

The first resource switching message includes first resource information. The first resource information is used to indicate the first resource satisfying resource switching requirements of the devices in the service group. The first resource includes the first target resource.

This embodiment of the present invention provides user equipment, including the sending module, configured to send a first resource switching message, where the first resource switching message is used to instruct devices in a service group to perform resource switching.

Based on the description of the foregoing embodiment, the user equipment provided in the present invention can switch resources in a service group by sending a first resource switching message. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 7

Figure 7:
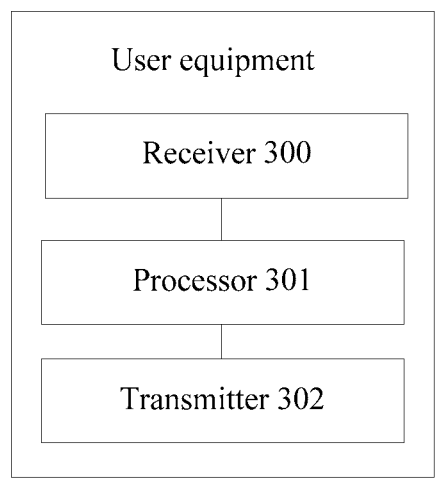
FIG. 7 is a schematic structural diagram 3 of user equipment according to an embodiment of the present invention.

An embodiment of the present invention provides user equipment. As shown in FIG. 7, FIG. 7 is a schematic structural diagram of the user equipment. The user equipment includes a receiver 300, a processor 301, and a transmitter 302.

The receiver 300 is configured to receive a first resource switching message sent by a second device, where the first resource switching message is used to instruct a first device to perform resource switching, the first resource switching message includes first resource information, the first resource information is used to indicate a resource satisfying a resource switching requirement of the second device, and the first device and the second device belong to a same service group.

The processor 301 is configured to determine a second resource in a first resource.

The transmitter 302 is configured to send a second resource switching message, where the second resource switching message includes the second resource.

The first resource switching message further includes a first switching time. The first switching time is a time that is indicated by the second device and that is used by the first device and the second device to perform resource switching.

The first resource includes a first target resource and a first candidate resource. The second resource includes a second target resource. The processor 301 is specifically configured to: if the first target resource satisfies a resource switching requirement of the first device, determine the first target resource as the second target resource; or if the first target resource does not satisfy the resource switching requirement of the first device, determine a resource in the first candidate resource as the second target resource, where the second target resource is a resource that is in the first candidate resource, that satisfies the resource switching requirement of the first device, and that has optimal quality.

The second resource further includes a second candidate resource. The processor 301 is further configured to determine the second candidate resource in the first candidate resource, where the second candidate resource is a resource other than the second target resource in resources satisfying the resource switching requirement of the first device.

A resource response message further includes a second switching time. The second switching time is a time that is indicated by the first device and that is used by the first device and the second device to perform resource switching.

If the second target resource is the first target resource, the second switching time is the first switching time. If the second target resource is a resource in the first candidate resource, the second switching time is a time obtained by adding the first switching time and preset duration.

The first target resource includes at least one of a time resource or a frequency resource. The first candidate resource includes at least one of a time resource or a frequency resource.

The first device is a primary device. Devices other than the first device in the service group are member devices. The transmitter 302 is further configured to send a first indication, where the first indication is used to instruct each member device in the service group to report information about a resource satisfying a resource switching requirement of the member device.

The second device includes each member device in the service group. The first resource information includes information that is reported by each member device and that is about a resources satisfying the resource switching requirement of the member device. The second resource information is used to indicate a resource satisfying the resource switching requirement of each member device.

A second resource switching message includes a third switching time. The third switching time is a time used by each member device to perform resource switching.

This embodiment of the present invention provides user equipment, including: the receiver, configured to receive a first resource switching message sent by a second device, where the first resource switching message is used to instruct a first device to perform resource switching, the first resource switching message includes first resource information, the first resource information is used to indicate a resource satisfying a resource switching requirement of the second device, and the first device and the second device belong to a same service group; the processor, configured to determine a second resource in a first resource, where second resource information is used to indicate a resource satisfying a resource switching requirement of the first device; and the transmitter, configured to send a second resource switching message, where the second resource switching message includes the second resource information.

Based on the description of the foregoing embodiment, the user equipment provided in the present invention receives a first resource switching message sent by a first device, and determines second resource information according to first resource information in the first resource switching message. Resources in the second resource information are resources that can satisfy resource switching requirements of the user equipment equipment and the second device. Therefore, resources in a service group can be switched by using the foregoing method. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 8

Figure 8:
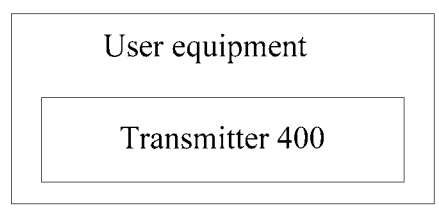
FIG. 8 is a schematic structural diagram 4 of user equipment according to an embodiment of the present invention.

An embodiment of the present invention provides user equipment. As shown in FIG. 8, FIG. 8 is a schematic structural diagram of the user equipment. The user equipment includes a transmitter 400.

The transmitter 400 is configured to send a first resource switching message, where the first resource switching message is used to instruct devices in a service group to perform resource switching.

The first resource switching message includes first resource information. The first resource information is used to indicate a first resource satisfying a resource switching requirement of a first device. The first resource includes a first target resource and a first candidate resource.

The first resource switching message further includes a first switching time. The first switching time is a time that is indicated by the first device and that is used by the first device and the devices in the service group to perform resource switching.

The first device is a primary device. Devices other than the first device in the service group are member devices. The first resource switching message includes the first resource information. The first resource information is used to indicate the first resource satisfying resource switching requirements of the devices in the service group. The first resource includes a first target resource.

The user equipment provided in this embodiment of the present invention includes the transmitter, configured to send a first resource switching message, where the first resource switching message is used to instruct devices in a service group to perform resource switching.

Based on the description of the foregoing embodiment, the user equipment provided in the present invention can switch resources in a service group by sending a first resource switching message. When resources needed by the service group decrease, the service group may switch from currently-used resources to other available resources, thereby avoiding a waste of resources. When resources needed by the service group increase, the service group may switch from currently-used resources to other available resources, thereby improving data transmission efficiency in the service group.

Embodiment 9

Figure 9:
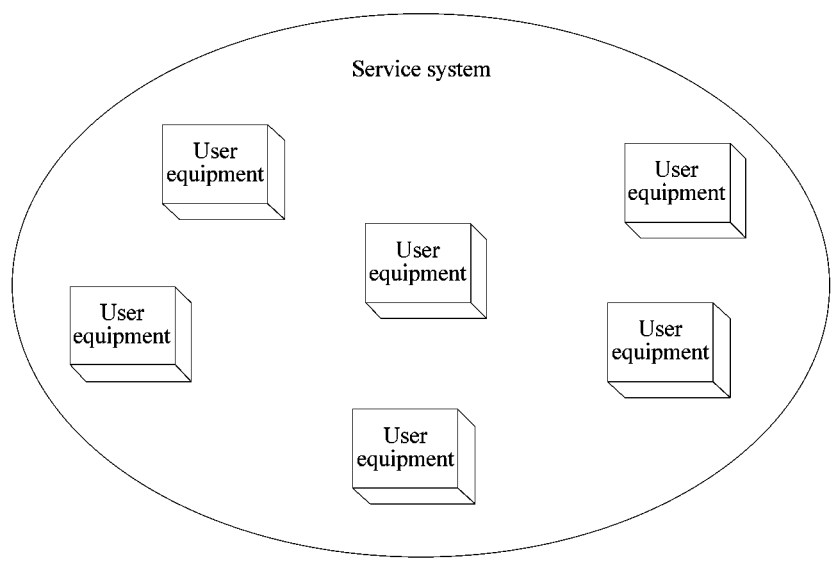
FIG. 9 is a schematic systematic diagram 1 of a service system according to an embodiment of the present invention.

An embodiment of the present invention provides a service system. As shown in FIG. 9, FIG. 9 is a schematic systematic diagram of the service system. User equipments in the service system are peer devices.

The service system includes at least one user equipment as described in Embodiment 5 and at least one user equipment as described in Embodiment 6. Alternatively, the service system includes at least one user equipment as described in Embodiment 7 and at least one user equipment as described in Embodiment 8.

A specific flowchart of performing resource switching by the service system (referred to as a service group C below) is provided below. For example, the service group C includes three devices (a device 1, a device 2, and a device 3). The device 1 first initiates a resource switching process according to a current data transmission requirement. That is, the device 1 sends a first resource switching message to the devices in the service group C. First resource information in the first resource switching message includes a first target resource a(#1), first candidate resources b(#3), c(#5), and d(#7), and a first switching time T1. After receiving the first resource switching message, the device 2 and the device 3 separately determine second resource information according to the first resource information in the first resource switching message. The device 2 determines second resource information after monitoring, and the second resource information includes a second target resource b(#3), second candidate resources c(#5) and d(#7), and a second switching time T1. The device 2 adds the determined second resource information to a second resource switching message and sends the second resource switching message to the devices in the service group C. The device 1 and the device 3 both receive the second resource switching message. The device 1 records only the second resource information in the second resource switching message. After detecting the second resource switching message sent by the device 2, the device 3 determines, according to the second resource information in the second resource switching message, a target resource and a candidate resource that satisfy a resource switching requirement of the device 3 and a switching time. The device 3 eventually determines that a target resource is b(#3), candidate resources are c(#5) and d(#7), and a switching time is a moment T1. Eventually, the service group C uses the resource b(#3) as the target resource for resource switching and T1 as the switching time.

Further, in a resource switching process of the service system, if the device 3 eventually determines that the target resource is c(#5), the candidate is d(#7), and the switching time is T2, and T2 is later than T1, after receiving a resource switching message sent by the device 3, the device 1 and the device 2 determine again a target resource and a candidate resource of the device 1 and the device 2 according to the new switching time. For example, the device 1 first determines, according to the resource switching message sent by the device 3, that a target resource of the device 1 is c(#5 and #6), a candidate resource is d(#7 and #8), a switching time is the moment T2 and sends a resource switching message of the device 1 to the devices in the service group. After the device 2 receives the resource switching message of the device 1, the device 2 determines that a target resource of the device 2 is c(#5 and #6) and a switching time is T2. The service group switches to the resource c(#5 and #6) at the moment T2 to perform communication.

Figure 10:
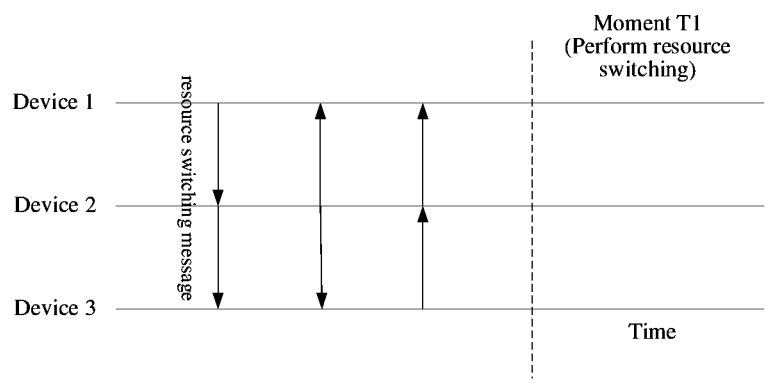
FIG. 10 is a schematic diagram 1 of a resource switching process according to an embodiment of the present invention.
Figure 11:
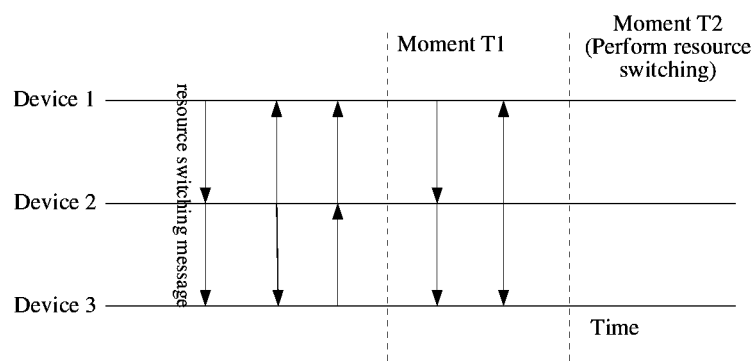
FIG. 11 is a schematic diagram 2 of a resource switching process according to an embodiment of the present invention.

As shown in FIG. 10, FIG. 10 is a schematic diagram of switching of the resource switching process performed at a moment T1. As shown in FIG. 11, FIG. 11 is a schematic diagram of switching of the resource switching process performed at a moment T2.

Figure 12:
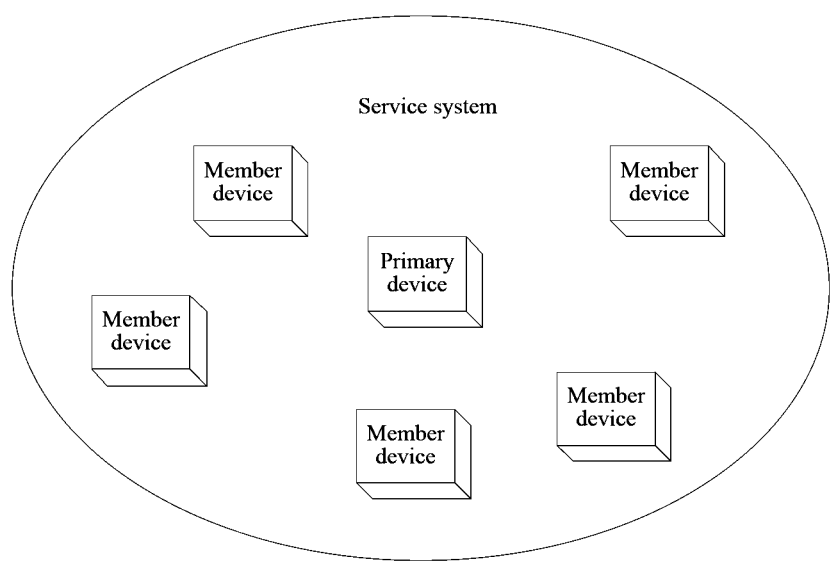
FIG. 12 is a schematic systematic diagram 2 of a service system according to an embodiment of the present invention.

An embodiment of the present invention provides another service system. As shown in FIG. 12, FIG. 12 is a schematic systematic diagram of the service system. The service system includes a primary device and several member devices.

A specific flowchart of performing resource switching by the service system (referred to as a service group D below) is provided below. For example, the service group D includes three devices (a device 1, a device 2, a device 3). It is assumed that a primary device that is determined by the service group D and that is responsible for time-frequency resource management is the device 1, and member devices are the device 2 and the device 3. The primary device may be determined randomly, or may be determined according to a result obtained through contention of devices. This is not limited in the present invention.

In mode 1 used by the service group D to perform resource switching, the device 1 monitors and manages a time-frequency resource in the service group D. When the device 1 detects that a data transmission resource in the service group D needs to be switched, the device 1 monitors an idle resource in a network, determines a target resource e(#1) and a switching time T3, adds the target resource and the switching time to a resource switching message, sends the resource switching message to all the devices in the service group D. For the service group D, when the switching time T3 is reached, the device 1, the device 2, and the device 3 perform resource switching and switch to the resource e(#1) to perform communication.

In mode 2 used by the service group D to perform resource switching, the device 1 monitors and manages a time-frequency resource in the service group D. When the device 1 monitors that the data transmission resource in the service group D needs to be switched, the device 1 instructs at least one device in the service group D to monitor a resource in a network (specifically, the device 1 may instruct only the device 2 to monitor a resource in the network, or instruct both the device 2 and the device 3 to monitor a resource in the network). Optionally, the device 1 may monitor a resource in the network. The device 1 integrates results of monitoring resources in the network by at least one device in the service group D, determines a target resource f(#2) satisfying resource switching performed by the service group D and a switching time T4, adds the target resource and the switching time to a resource switching message, and sends the resource switching message to the devices (including the device 2 and the device 3) in the service group D. When the switching time T4 is reached, the devices in the service group D perform resource switching.

In mode 3 used by the service group D to perform resource switching, the device 2 in the service group D detects that a current time-frequency resource does not satisfy a service requirement of the device 2, determines, by monitoring a resource in a network, a target resource and an idle resource that satisfy the service requirement of the device 2, and sends the target resource and the idle resource to the device 1 (a primary device). After receiving a resource switching request sent by the device 2, the device 1 may directly instruct the device 2 to perform resource switching, and sends, to other devices in the service group D, the target resource and the switching time sent by the device 2. After the switching time is reached, the service group D performs resource switching. Alternatively, after receiving a resource switching request sent by the device 2, the device 1 may first instruct other devices in the service group D to monitor a resource in the network, make integrated processing after receiving monitoring results of the devices in the service group D, determine a target resource and a switching time, and send the eventually determined target resource and switching time to the devices in the service group.

Based on the description of the foregoing embodiment, the service system provided in the present invention can switch resources in a service group. When resources needed by the service group decrease, the service group may switch from currently-used resources to other available resources, thereby avoiding a waste of resources. When resources needed by the service group increase, the service group may switch from currently-used resources to other available resources, thereby ensuring normal transmission of data in the service group.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource switching method, comprising:
receiving, by a first device, a first resource switching message sent by a second device, wherein the first device and the second device belong to a same neighbor awareness networking (NAN) service group, the first resource switching message is used to instruct devices in the same NAN service group to perform resource switching, the first resource switching message comprises first resource information, and the first resource information is used to indicate a first resource satisfying a resource switching requirement of the second device, wherein the first resource switching message further comprises a first switching time, and the first switching time is a time that is indicated by the second device and that is used by the first device and the second device to perform resource switching;
determining, by the first device, a second resource according to the first resource switching message, wherein the second resource is a resource satisfying a resource switching requirement of the first device; and
sending, by the first device, a second resource switching message, wherein the second resource switching message comprises second resource information, and the second resource information is used to indicate the second resource.

2. The resource switching method according to claim 1, wherein the first resource comprises a first target resource, and the second resource comprises a second target resource, and the determining, by the first device, a second resource according to the first resource switching message comprises: when the first target resource satisfies the resource switching requirement of the first device, determining, by the first device, the first target resource as the second target resource.

3. The resource switching method according to claim 2 wherein the first resource further comprises at least one first candidate resource, and the determining, by the first device, a second resource according to the first resource switching message further comprises:

when the first target resource does not satisfy the resource switching requirement of the first device, determining, by the first device, a resource in the at least one first candidate resource as the second target resource, wherein the second target resource is a resource that is in the at least one first candidate resource, and that satisfies the resource switching requirement of the first device.

4. The resource switching method according to claim 3, wherein the second resource further comprises a second candidate resource, and after the determining, by the first device, the second target resource, the method further comprises:

determining, by the first device, the second candidate resource in the at least one first candidate resource, wherein the second candidate resource is a resource other than the second target resource in the second resource.

5. The resource switching method according to claim 2, wherein the resource response message further comprises a second switching time, and the second switching time is a time that is indicated by the first device and that is used by the first device and the second device to perform resource switching, wherein when the second target resource is the first target resource, the second switching time is the first switching time; or when the second target resource is a resource in the first candidate resource, the second switching time is a time obtained by adding the first switching time and a preset duration of time.

6. The resource switching method according to claim 2, wherein the first target resource comprises at least one of a time resource or a frequency resource; and the at least one first candidate resource comprises at least one of the time resource or the frequency resource.

7. The resource switching method according to claim 1, wherein the first device is a primary device, devices other than the first device in the same service group are member devices, and before the receiving, by a first device, a first resource switching message sent by a second device, the method further comprises:

sending, by the primary device, a first indication, wherein the first indication is used to instruct each member device in the same NAN service group to report information about a resource satisfying a resource switching requirement of the member device.

8. An electronic device, comprising:

a receiver, configured to receive a first resource switching message sent by a second device, wherein the electronic device and the second device belong to a same same neighbor awareness networking (NAN) service group, the first resource switching message is used to instruct devices in the same NAN service group to perform resource switching, the first resource switching message comprises first resource information, and the first resource information is used to indicate a first resource satisfying a resource switching requirement of the second device, wherein the first resource switching message further comprises a first switching time, and the first switching time is a time that is indicated by the second device and that is used by the electronic device and the second device to perform resource switching;

a processor, configured to determine a second resource according to the first resource switching message, wherein the second resource is a resource satisfying a resource switching requirement of the electronic device; and a transmitter, configured to send a second resource switching message, wherein the second resource switching message comprises the second resource information, and the second resource information is used to indicate the second resource.

9. The electronic device according to claim 8, wherein the first resource information comprises a first target resource, the second resource information comprises a second target resource, and the processor is configured to:

when the first target resource satisfies the resource switching requirement of the electronic device, determine the first target resource as the second target resource.

10. The electronic device according to claim 9, wherein the first resource further comprises at least one candidate resource, and the processor is further configured to:

when the first target resource does not satisfy the resource switching requirement of the electronic device, determine a resource in the at least one first candidate resource as the second target resource, wherein the second target resource is a resource that is in the at least one first candidate resource, and that satisfies the resource switching requirement of the electronic device, and that has optimal quality.

11. The electronic device according to claim 10, wherein the second resource information further comprises a second candidate resource, and the processor is further configured to: after determining the second target resource, determine the second candidate resource in the at least one first candidate resource, wherein the second candidate resource is a resource other than the second target resource in the second resource.

12. The electronic device according to claim 9, wherein the resource response message further comprises a second switching time, and the second switching time is a time that is indicated by the electronic device and that is used by the electronic device and the second device to perform resource switching, wherein when the second target resource is the first target resource, the second switching time is the first switching time; or when the second target resource is a resource in the first candidate resource, the second switching time is a time obtained by adding the first switching time and a preset duration of time.

13. The electronic device according to claim 9, wherein the first target resource comprises at least one of a time resource or a frequency resource; and the at least one first candidate resource comprises at least one of the time resource or the frequency resource.

14. The electronic device according to claim 9, wherein the first resource further comprises at least one candidate resource, and the processor is further configured to:
when the first target resource does not satisfy the resource switching requirement of the electronic device, determine a resource in the at least one first candidate resource as the second target resource, wherein the second target resource is a resource that is in the at least one first candidate resource, and that satisfies the resource switching requirement of the electronic device.

15. The electronic device according to claim 8, wherein the electronic device is a primary device, devices other than the electronic device in the same service group are member devices, and
the transmitter is further configured to: before the receiver receives the first resource switching message sent by the second device, send a first indication, wherein the first indication is used to instruct each member device in the same NAN service group to report information about a resource satisfying a resource switching requirement of the member device.

16. A service system, comprising at least two devices according claim 8.

17. The electronic device according to claim 8 wherein the first resource further comprises at least one candidate resource, and the processor is further configured to:
when the first target resource does not satisfy the resource switching requirement of the electronic device, determine a resource in the at least one first candidate resource as the second target resource, wherein the second target resource is a resource that is in the at least one first candidate resource, and that satisfies the resource switching requirement of the electronic device.

* * * * *

UNITED STATES PATENT AND TRADEMARK OFFICE
CERTIFICATE OF CORRECTION

PATENT NO. : 10,356,676 B2
APPLICATION NO. : 15/567693
DATED : July 16, 2019
INVENTOR(S) : Chen et al.

Page 1 of 1

It is certified that error appears in the above-identified patent and that said Letters Patent is hereby corrected as shown below:

In the Claims

Claim 10, Column 26, Line 42 - Line 43:
"resource switching requirement of the electronic device, and that has optimal quality."
Should read:
-- resource switching requirement of the electronic device. --

Signed and Sealed this
Third Day of March, 2020

Andrei Iancu
*Director of the United States Patent and Trademark Office*